Feb. 3, 1959     W. H. DU BOIS     2,871,987
WHEEL AND BRAKE ASSEMBLY
Original Filed March 1, 1950     4 Sheets-Sheet 1

INVENTOR.
WILLIAM H. DU BOIS
BY
ATTORNEY

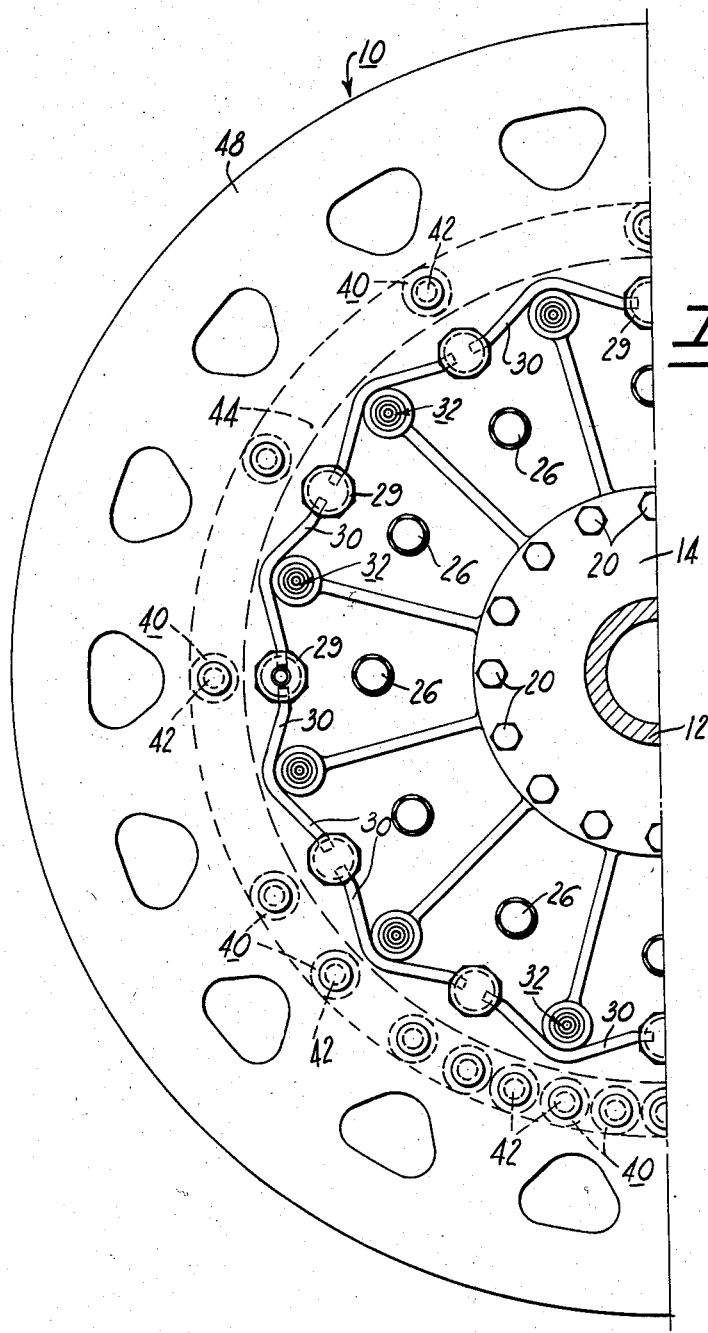

INVENTOR.
WILLIAM H. DuBOIS
BY
ATTORNEY

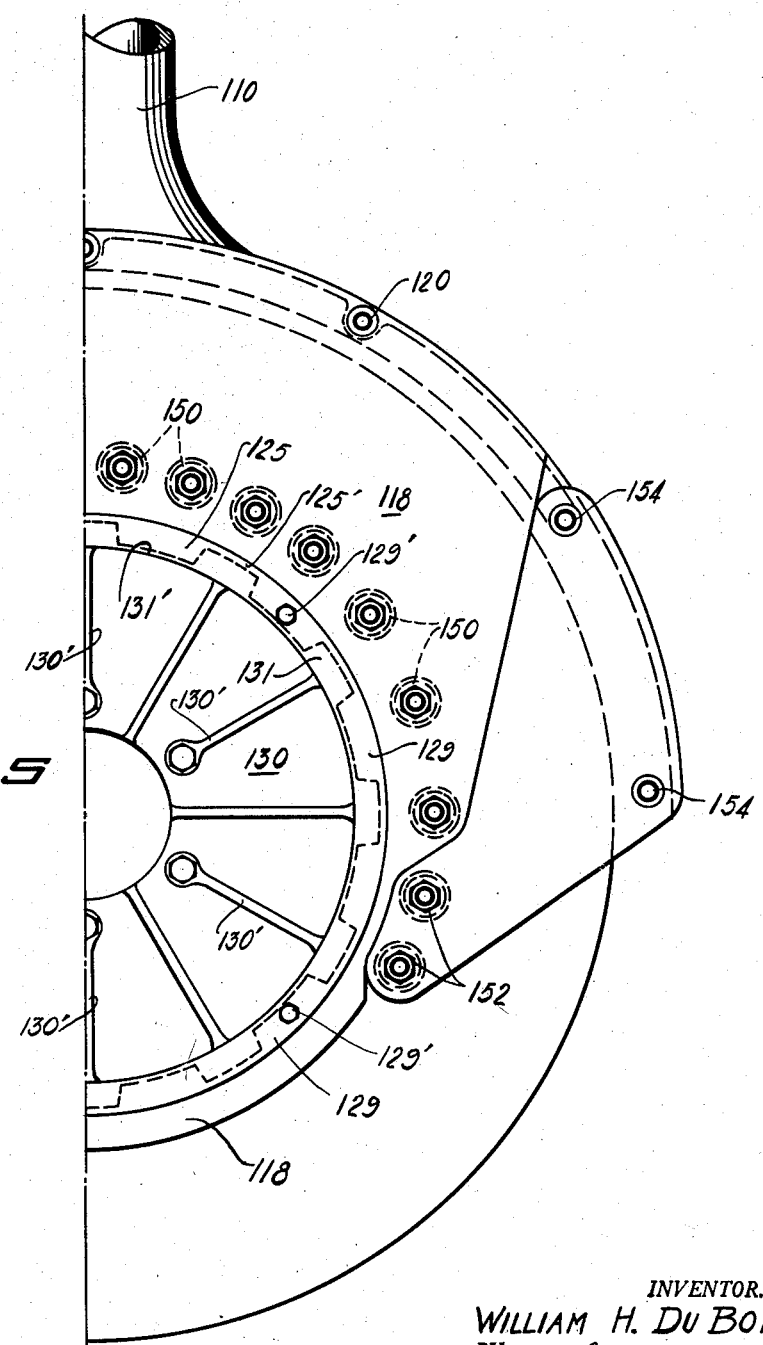

2,871,987

WHEEL AND BRAKE ASSEMBLY

William H. Du Bois, South Bend, Ind., assignor to Bendix Aviation Corporation, South Bend, Ind., a corporation of Delaware Continuation of abandoned application Serial No. 147,087, March 1, 1950. This application July 18, 1955, Serial No. 522,501

6 Claims. (Cl. 188—18)

The present invention relates to improvements in a wheel and brake assembly, and more particularly to an aircraft wheel and brake of relatively narrow cross-section and high brake capacity. This application is a continuation of my copending application Serial No. 147,087, filed March 1, 1950, now abandoned, which is to be superseded by the present application.

The need for narrower aircraft wheel and brake assemblies is becoming more pressing as aircraft designs are developed for faster speeds. Any part of the craft which projects into the air stream presents a drag which reduces the craft's speed, and this reduction is of vital concern, especially during take-offs when maximum acceleration is necessary. By reducing the width of the wheel and brake assemblies, less frontal area will be exposed to produce this drag. Another modern aircraft design tendency is to reduce the thickness of the wing sections; thus, if it is desired to retract the wheel into a wing section, the wheel must be of a corresponding narrow dimension.

The present invention is concerned with a wheel and brake assembly of the type disclosed in application Serial No. 786,720, filed November 18, 1947, now Patent No. 2,616,525. In such type of wheel and brake assembly, the major diametric portion of the wheel is occupied by a nonrotating brake and wheel supporting structure which takes the form of a pair of plates, spaced apart to permit the braking components to be housed therebetween; and the rotating tire-carrying portion of the wheel, which constitutes the wheel proper, is mounted on bearings located on the peripheries of the plates. The structure of Patent No. 2,616,525 attains the very important object of a considerable reduction in the over-all width of the assembly, but the bearings constitute an extremely expensive item. The reason for this may be briefly explained as follows: Wheels for aircraft landing gear may have a diameter of sixty inches or more, and this necessitates correspondingly large-diameter bearings. The bearings of the wheel of the above-noted patent are of the conventional type, to the extent that they consist of an assembly including inner and outer races, rollers or balls and the usual bearing cage for the latter. However, the large diameter of the bearing renders it extremely difficult to meet the tolerances required for proper bearing efficiency, and a large number of bearing elements (rollers or balls) are required for each assembly. Also, should it become necessary to replace any of the bearing elements during the life of the wheel, the entire bearing assembly must be serviced, to ensure proper functioning of the bearing.

An object of the present invention, therefore, is to provide a wheel and brake assembly having the advantages of a wheel of the type disclosed in the above-noted Patent No. 2,616,525 but which may be more economically manufactured and serviced, due primarily to an arrangement of parts enabling the bearing elements to be assembled and disassembled independently of one another and at the same time requiring fewer elements and less exactness as to tolerances.

Other objects will become apparent as the description proceeds.

In the drawings:

Figure 2 is a partial side elevation of Figure 1;

Figure 5 is another elevation of Figure 3 as viewed from the side opposite that of Figure 4.

Figure 1:
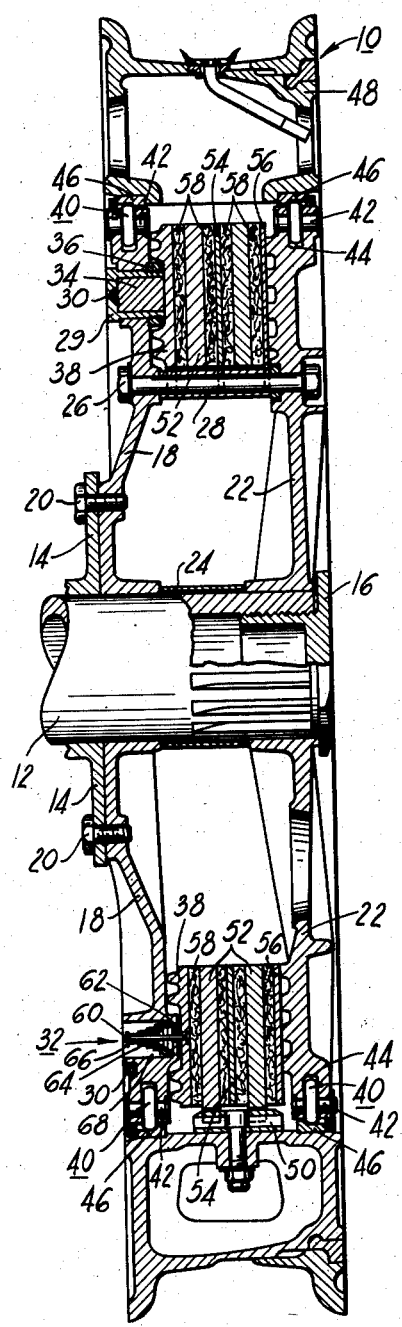
Figure 1 is an axial section of an embodiment of the present invention.

Referring to the drawings and more particularly to Figure 1, the wheel and brake assembly 10 is secured on an axle stub 12 by means of the axle flange 14 and the hub nut 16, a wheel and brake support in the form of a plate 18 being fastened to flange 14 by means of bolts 20 and another wheel and brake support or plate 22 being held against outward movement by the abutting engagement of hub nut 16. The central portions of the two wheel and brake supports 18 and 22 are spaced apart by means of the sleeve 24 which is telescoped over the axle stub 12. Further holding of the supports 18 and 22 together is achieved by using a plurality of circumferentially spaced bolts 26, each bolt carrying an anchor sleeve, or key member 28 which serves the dual purpose of spacing the supports 18 and 22 and acting as a means for holding certain of the brake members in position.

Radially outwardly beyond the bolts 26 is located the brake mechanism which will now be described. Carried in the wheel and brake support 18 are a plurality of circumferentially spaced cylinder inserts 29 which have their interiors interconnected by means of conduit members 30 which may be secured in place by any suitable means and in the illustrated embodiment by brazing. Located between each pair of cylinder inserts 29 are return spring assemblies 32 which will be described more fully hereinafter. The cylinder inserts 29 are secured in place by means of the nuts 36 which bear against the inner side of the support 18. Reciprocably received in the cylinder inserts 29 are pistons 34 which are adapted to forcibly move, in an axial direction, the annular brake pressure plate 38. This brake pressure plate 38 is provided with a plurality of circumferentially spaced slots or notches in its inner periphery which fit over the key members 28, whereby it is capable of axial movement while being held against rotation. Fastened to the radially outer extremity of the supports 18 and 22 are a plurality of circumferentially spaced roller bearing assemblies 40. The illustrated version of the present invention shows these assemblies as being journaled on pins 42 extending parallel to the axis of wheel rotation, and disposed in companion radial notches 44, a slight clearance being provided between the bearing assemblies and the bottoms of notches 44 for a purpose which will later become apparent.

As will be seen more clearly in Figure 2, the bearings 40 are spaced quite closely together at the bottom, which is the ground contacting side of the assembly, and are progressively spaced farther apart as the top side of the assembly is approached. The purpose of having the bearings at the bottom spaced closely together is that these bearings are directly in the path of load transfer from the rotating part of the wheel to the axle 12, the remainder of the bearings not being subjected to as great a load, hence the need for fewer bearings spaced farther apart.

Large-diameter annular bearing races 46 are pressed into annular recesses formed in the sides of box section wheel 48 to ride on radially outwardly protruding portions of bearings 40. Thus it is seen that the wheel 48, of the wheel and brake assembly, is journaled on the supports 18 and 22 by means of the unevenly spaced bearings 40.

Fastened to the inner periphery of the wheel 48 are a plurality of circumferentially spaced key members 50 which have keyed thereto for axial movement the brake elements or friction discs 52. Interleaved with these friction discs 52 is a non-rotatable friction disc 54 keyed to key members 28. Also engaging key members 28 is another non-rotatable friction disc 56 which abuts against the brake support 22 and is engageable by the right-hand rotatable brake disc 52. The pressure plate 38 and the brake discs 54 and 56 carry suitable friction lining 58 adapted to frictionally rub the rotatable brake elements 52. Thus it is seen that by introducing fluid under pressure into the connecting conduits 30, the pistons 34 will be forced outwardly compressing the brake discs 52, 54, and 56 together to produce frictional resistance against the rotation of wheel 48.

To urge the brakes to released position, return spring assemblies 32 are utilized each of which comprises a pin 60 which passes through an opening 62 in brake support 18, and is anchored to the pressure plate 38. A frusto-conical ribbon spring 64 surrounds pin 60, bearing against collar 66 on pin 60 and the bottom of the recess 68 in brake support 18 to urge each pin 60 and the pressure plate 38 to the left and released position.

In operation, fluid under pressure is introduced into the conduits 30 which forces the pistons 34 outwardly whereupon the brake discs are compressed into frictional engagement. In order to release the brakes, the pressure in the conduits 30 is relieved allowing the return spring assemblies 32 to withdraw the pressure plate 38 from compressive engagement.

By using the independently mounted bearing assemblies 40, it is possible to produce a wheel more economically than it is by utilizing a single bearing assembly including inner and outer race rings and a bearing cage having a radius substantially the size of the radius of the inner periphery of the wheel 48. The bearing assemblies 40 are currently produced in mass production quantities which obviously conduces to greater economy. While the drawings show the bearing assemblies 40 as being of the roller type, it is to be understood that a ball type of bearing assembly may be used without departing from the ambit of this invention. The broad inventive concept is directed to the use of multiple bearing assemblies, independently mounted and arranged as shown in lieu of the large diameter bearing assembly disclosed in the aforementioned Du Bois application.

Figure 3:
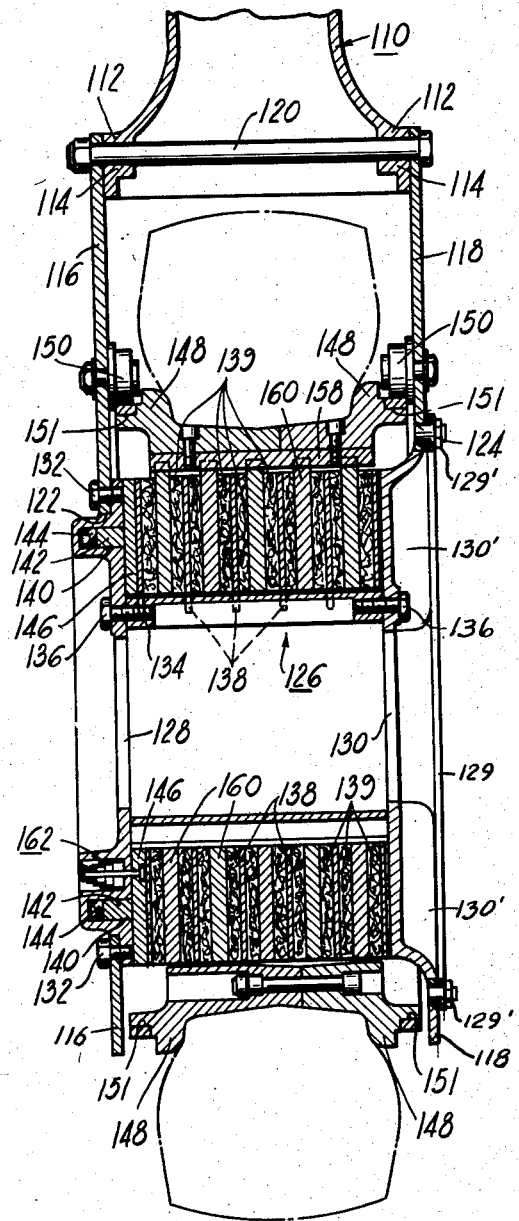
Figure 3 is an axial section of another embodiment of the present invention.
Figure 4:
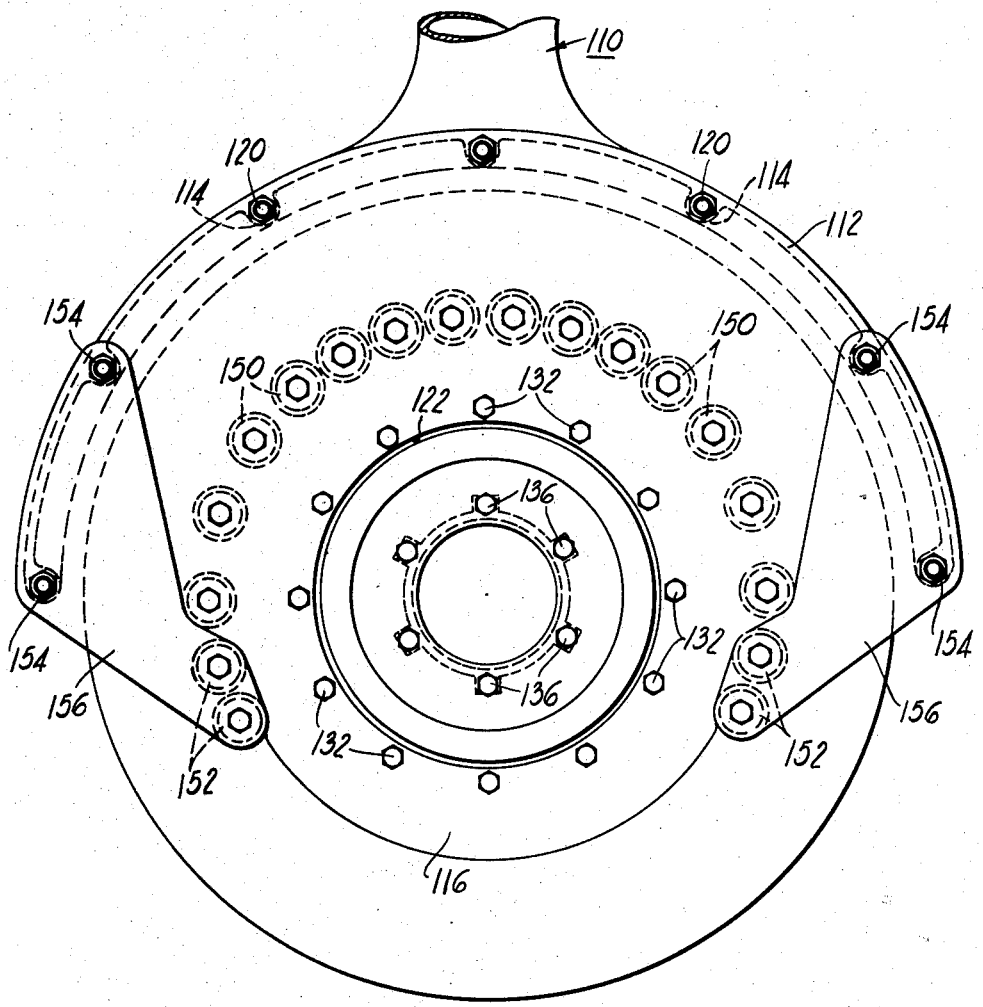
Figure 4 is a side elevation of Figure 3.

Referring now to Figures 3, 4, and 5, another embodiment of the present invention is illustrated showing a strut 110 adapted to be fastened to the airplane. Projecting downwardly from the lower extremity of strut 110 is a part cylindrical supporting-flange 112 which is shown formed integral with strut 110. Flange 112 is formed with spaced ears 114 perforated for a purpose to become apparent hereafter.

Extending downwardly from the lateral edges of flange 112 are a pair of wheel and brake-supporting members or carriers 116 and 118 which are secured in place by means of bolts 120 received in the openings in ears 114. These wheel and brake supports or carriers 116 and 118 are provided with concentric circular openings 122 and 124, respectively, which receive corresponding portions of the brake assembly 126, the radially-inner edge of support 118 being serrated as at 125 and 125'. The brake assembly 126 is comprised of a pair of spaced side plates 128 and 130, side plate 128 being suitably secured in opening 122 and plate 130 in opening 124, the radially outer edge of plate 130 having serrations 131 and 131' which mate with the serrations 125 and 125' of the support 118. The plate 128 is connected to the supporting member 116 as by bolts 132, while the mated serrated edges of plates 130 and 118 are covered and braced by a flat ring 129, which is bolted to the serrated edge of the member 118 as at 129'. Thus plate 130, which functions as a carrier for the non-rotating braking elements as well as a backing plate, is locked against rotation and torsional stresses. These side plates 128 and 130 are spaced apart by a plurality of circumferentially spaced channel-shaped key members 134 secured in place by means of bolts 136. Keyed to these key members 134 are a plurality of non-rotatable brake discs 138 provided with friction lining 139. Plate 130 is preferably formed with a series of radial ribs 130'.

An annular chamber 140 is formed in side plate 128, and it reciprocably receives an annular piston 142 provided with a rubber or the like seal 144 to prevent the leakage of fluid around piston 142. Thus the plate 128 functions both as a brake carrier and a brake cylinder housing. Also keyed to key members 134 is a pressure plate 146 faced with friction lining and adapted to be moved axially by the protractile movement of piston 142.

A tire-carrying rim member which constitutes the rotating wheel proper is indicated at 148; it is concentrically supported about the brake assembly 126 by means of circumferentially-spaced ball bearing assemblies 150 journaled on the brake supports 116 and 118 and which engage the outer peripheral surfaces of annular race flanges 151 extending axially outwardly from the rim of the wheel 148. As viewed in Figure 4, the bearings at the top side are closely spaced while those along the sides are spaced farther apart, the reason for this spacing arrangement being to utilize bearings only at points where actually required viz. between the load transfer points of the wheel and its supporting structure, to thereby materially reduce bearing cost. The two end bearings 152, on each side of the assembly, are disposed immediately below the horizontal diameter of the wheel 148, their primary function being to provide vertical support for the wheel as the airplane leaves the ground.

As viewed in Figures 4 and 5, the tire on the wheel 148 protrudes from the lower portions of brake supports 116 and 118 to engage the ground surface.

A plurality of circumferentially spaced key members 158 are secured to the inner periphery of wheel 148 to support for rotation and axial movement the brake discs 160 which are interleaved with the non-rotatable brake discs 138.

In operation, the wheel 148 will rotate within the circumferential confines of bearings 150, and the load between the airplane and the wheel 148 will pass through the upper portions of brake supports 116 and 118, upper bearings 150, flanges 151, to the wheel 148. If it is desired to apply the brakes, fluid under pressure is injected into the cylinder 140 forcing pressure plate 146 toward the right to compress all of the brake discs 138 and 160. The frictional resistance developed by the contacting surfaces of these brake discs produces the retarding torque for braking the airplane. Return spring assemblies 162 are fastened to the pressure plate in a manner such as to yieldably urge the pressure plate 146 to the left and piston 142 into the cylinder 140, this brake release taking place upon the reduction of the pressure utilized to apply the brakes.

The wheel and brake assembly of Figures 3, 4, and 5 may be readily disassembled for servicing. For example, by merely removing the bolts 132 and ring 129, the brake assembly may be withdrawn as a unit, toward the right, from its assembled relation with the wheel 148, the friction elements 160 sliding axially along the keys 158. The wheel 148 itself may be removed from the strut 110, following removal of the brake assembly, by removing the lowermost bolts 154, allowing the aprons or flaps 156 to be swung outwardly about the respective upper bolts 154, thereby releasing the bearings 152 from engagement with wheel flanges 151. The wheel 148 is then merely dropped or withdrawn from the supporting plates 116 and 118.

Although several embodiments of the invention have been illustrated and described, various changes in the form and relative arrangements of the parts may be made to suit requirements.

I claim:
1. A hubless wheel and brake assembly comprising a pair of axially spaced brake supports adapted to be secured to a rigid portion of the supported vehicle, a plurality of circumferentially spaced fastening members securing said brake supports together, spacer means associated with said fastening members for holding said brake supports apart, a plurality of circumferentially spaced anti-friction bearing assemblies journaled on said brake supports to be in direct supportive engagement with the rim of said wheel, the circumferential spacing between said bearings varying to provide closely spaced bearings at one side of said brake supports and wider spaced bearings diametrically from the circumferential location of said closely spaced bearings a plurality of circumferentially spaced axially extending key members secured to the inner periphery of said wheel, one or more rotatable brake discs supported by said key members for rotation with said wheel and for axial movement, said discs being arranged to occupy the major axial portion between the sides of said wheel, a plurality of circumferentially spaced key members carried by said brake supports, one or more non-rotatable brake discs supported by said last mentioned key members for axial movement only and interleaved with said rotatable brake discs, one of said brake supports having hydraulic actuator means transversely mounted therein for producing frictional engagement of said brake discs, and means for yieldably urging said brake discs out of frictional engagement.

2. A hubless wheel and brake assembly comprising a pair of axially spaced brake supports adapted to be secured to a rigid portion of the supported vehicle, a plurality of circumferentially spaced fastening members securing said brake supports together, spacer means associated with said fastening members for holding said brake supports apart, a plurality of circumferentially spaced anti-friction bearing assemblies journaled on said brake supports, the circumferential spacing between said bearings varying to provide closely spaced bearings on one side of said brake supports along a portion of the circumference thereof and wider spaced bearings in the regions diametrically from the closely spaced bearings, a wheel rotatably supported at the rim portion thereof by said bearings which are located in substantial alignment with said axially spaced brake supports, one or more rotatable brake discs supported for rotation with said wheel and occupying the major axial portion between the supporting sides of said wheel, said brake discs being axially movable with respect thereto, one or more non-rotatable brake discs supported by said brake supports for axial movement only and interleaved with said rotatable brake discs, one of said brake supports having hydraulic actuator means transversely mounted in said brake support for producing frictional engagement of said brake discs, and means for yieldably urging said brake discs out of frictional engagement.

3. A hubless wheel and brake assembly comprising a pair of axially spaced brake supports adapted to be secured to a rigid portion of the supported vehicle, a plurality of circumferentially spaced fastening members securing said brake supports together, spacer means associated with said fastening members for holding said brake supports apart, a plurality of circumferentially spaced anti-friction bearings journaled on said brake supports and located in substantial alignment with the opposite ends of said hubless wheel, the circumferential spacing between said bearings varying to provide closely spaced bearings on one side of said brake supports and greater relative displacement of said bearings diametrically opposite from the closely spaced bearings on one side of said brake supports, a wheel rotatably supported at the rim portion thereof by said bearings between said brake supports, one or more rotatable brake discs supported for rotation with said wheel and for axial movement with respect thereto, and one or more non-rotatable brake discs supported by said brake supports for axial movement only and interleaved with said rotatable brake discs, said rotatable and non-rotatable brake discs occupying the major axial portion between the sides of said wheel, one of said brake supports having actuator means mounted therein for producing frictional engagement of said brake discs.

4. A hubless wheel and brake assembly comprising a pair of brake-supporting members having portions adapted to be secured to a rigid structure of the supported vehicle, a plurality of non-rotatable friction elements carried by said brake-supporting members for axial movement only, a plurality of anti-friction members rotatably supported on said brake-supporting members, the circumferential spacing between said anti-friction members being less at one side of said brake-supporting members than at the other side to provide for the differential loading about the circumference of said wheel, a wheel rotatably supported at the rim thereof by said anti-friction members between said brake-supporting members, said brake-supporting members being cut-away at one side to uncover the ground contacting portion of the wheel, and a plurality of rotatable friction elements carried by said wheel for rotational and axial movement and engageable with the aforementioned non-rotatable friction elements, said rotatable and non-rotatable friction elements being arranged to occupy the major axial portion between said wheel supporting sides.

5. A hubless wheel and brake assembly comprising a pair of brake-supporting members having portions adapted to be secured to a rigid structure of the supported vehicle, at least one non-rotatable friction element carried by said brake-supporting members for axial movement only, a plurality of anti-friction bearings rotatably supported at circumferentially spaced intervals on said brake-supporting members, a wheel rotatably supported by said bearings at the rim portion thereof between said brake-supporting members, said brake-supporting members being cut-away at one side to uncover the ground contacting portion of the wheel, and at least one rotatable friction element carried by said wheel for rotational and axial movement and engageable with the aforementioned non-rotatable friction element, certain of said bearings being removably secured in place to facilitate disassembly of the wheel and brake.

6. A hubless wheel and brake assembly comprising a pair of wheel and brake-supporting members which extend radially into direct supportive engagement with the rim of said wheel, a wheel rotatably mounted through the rim portion thereof on said wheel and brake-supporting members, a plurality of bearing assemblies positioned on said brake-supporting members and interposed between said members and the wheel rim to provide the rotatable mounting for said wheel, and rotatable and non-rotatable brake elements cooperatively associated with said wheel and its supporting members, said bearing assemblies being located in such manner that the major axial portion between the wheel sides is available for occupation by said rotatable and non-rotatable brake elements.

References Cited in the file of this patent
UNITED STATES PATENTS

| 551,196 | Richards | Dec. 10, 1895 |
| 801,174 | Bevington | Oct. 3, 1905 |
| 1,826,462 | Dixon et al. | Oct. 6, 1931 |
| 2,097,942 | Whitney | Nov. 2, 1937 |
| 2,410,470 | Wallace | Nov. 5, 1946 |

FOREIGN PATENTS

| 584,227 | France | Nov. 14, 1924 |